US006571150B2

(12) United States Patent
Arai et al.

(10) Patent No.: US 6,571,150 B2
(45) Date of Patent: May 27, 2003

(54) MANAGEMENT METHOD OF AUTOMATIC VENDING MACHINE AND AUTOMATIC VENDING MACHINE

(75) Inventors: Isao Arai, Tochigi (JP); Shigeru Hanagata, Saitama (JP); Yasuhiro Yamazaki, Gunma (JP)

(73) Assignee: Fuji Electric Co., Ltd., Kanagawa (JP)

( * ) Notice: Subject to any disclaimer, the term of this patent is extended or adjusted under 35 U.S.C. 154(b) by 0 days.

(21) Appl. No.: 09/819,610

(22) Filed: Mar. 29, 2001

(65) Prior Publication Data

US 2001/0041949 A1 Nov. 15, 2001

(30) Foreign Application Priority Data

Mar. 29, 2000 (JP) ....................................... 2000-090577
Sep. 14, 2000 (JP) ....................................... 2000-280274

(51) Int. Cl.[7] ................................................ G06F 17/00
(52) U.S. Cl. ........................ 700/236; 700/234; 700/241
(58) Field of Search ................................ 700/234, 236, 700/238, 241, 244; 705/14, 20

(56) References Cited

U.S. PATENT DOCUMENTS

| | | | | |
|---|---|---|---|---|
| 4,654,800 A | * | 3/1987 | Hayashi et al. | 700/236 |
| 4,674,055 A | | 6/1987 | Ogaki et al. | |
| 5,748,485 A | | 5/1998 | Christiansen et al. | |
| 5,769,269 A | * | 6/1998 | Peters | 221/7 |
| 5,848,398 A | * | 12/1998 | Martin et al. | 700/234 |
| 5,956,876 A | * | 9/1999 | Burdette et al. | 312/234.1 |
| 6,012,834 A | * | 1/2000 | Dueck et al. | 700/231 |
| 6,018,720 A | * | 1/2000 | Fujimoto | 705/26 |
| 6,230,150 B1 | * | 5/2001 | Walker et al. | 700/238 |
| 6,330,490 B1 | * | 12/2001 | Kim et al. | 700/234 |

FOREIGN PATENT DOCUMENTS

| | | |
|---|---|---|
| EP | 0 122 040 A1 | 10/1984 |
| EP | 0 809 221 A2 | 11/1997 |
| JP | 11-312175 | 11/1999 |
| WO | WO 96/42074 | 12/1996 |
| WO | WO 00/00972 | 1/2000 |
| WO | WO 00/11591 | 3/2000 |

* cited by examiner

*Primary Examiner*—Christopher P. Ellis
*Assistant Examiner*—Gene O. Crawford
(74) *Attorney, Agent, or Firm*—Sughrue Mion, PLLC

(57) ABSTRACT

An automatic vending machine 1 of the invention can sell items or goods including tangible items such as drinks and intangible items such as music soft which are supplied by plural vendors. The intangible items are sold by transmitting the desired data from intangible item-supplying companies A, B, C through a public communication line 8 to the automatic vending machine 1 and by writing the data in a recording medium. A control computer 20 automatically calculates sales amount of each vendor based on sales data of each vendor output from the automatic vending machine, and adjusts the sales amount of each vendor by transmitting the calculating result to a banking agency 6. According to the management method of automatic vending machine and the automatic vending machine of the invention, automatic sales of items supplied by different vendors can be easily spread at low cost and without securing both of new installation places or sites of the automatic vending machine and communication lines.

20 Claims, 7 Drawing Sheets

1 Automatic vending machine
2 Management company of automatic vending machine
3 to 5 Data transmitting server of intangible item supplying companies A to C
6 Banking agency
7 Repair service company
8 Public communication line
10 Main control unit
11 Customer operation unit
12 Accounting unit
13 Safe
14 Vending unit of tangible items
15 Communication unit
16 Vending unit for Company A
17 Vending unit for Company B
18 Vending unit for Company C
20 Control computer

FIG. 1

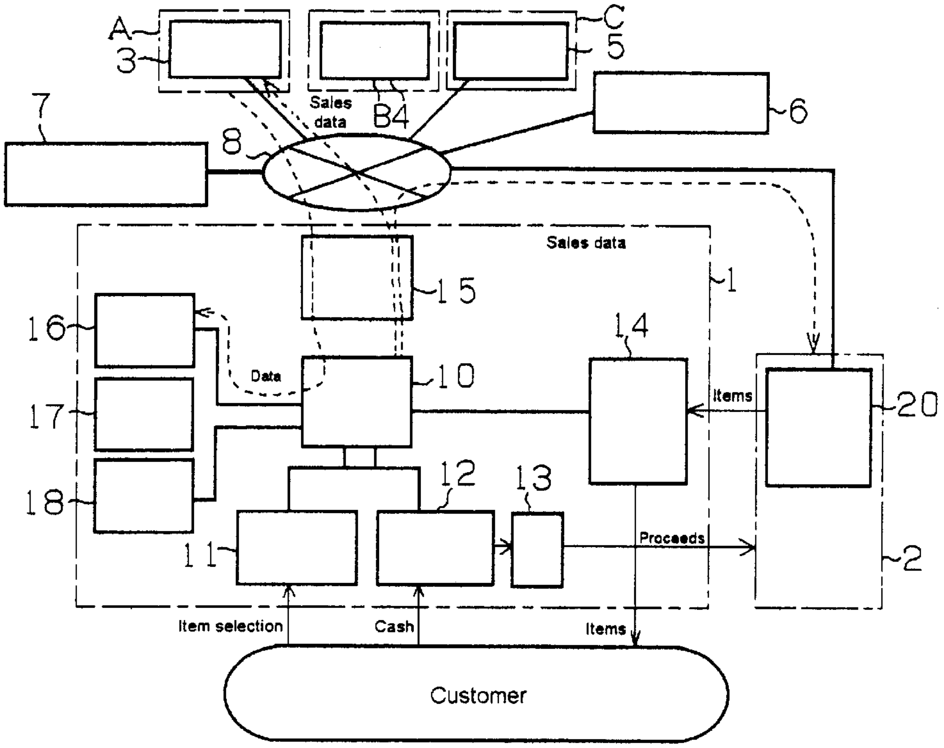

1 Automatic vending machine
2 Management company of automatic vending machine
3 to 5 Data transmitting server of intangible item supplying companies A to C
6 Banking agency
7 Repair service company
8 Public communication line
10 Main control unit
11 Customer operation unit
12 Accounting unit
13 Safe
14 Vending unit of tangible items
15 Communication unit
16 Vending unit for Company A
17 Vending unit for Company B
18 Vending unit for Company C
20 Control computer 21 Coin slot
22 Bill slot
23 Display
24 Keyboard
25 Refund lever
26 Coin return opening
27 Selection button of tangible items
28 Sample of items
29 Item dispense opening
30 Selection button of intangible items
31 to 33 insertion opening of recording media

FIG.5

| Item | Price | Sales Date | Vender | --- |
|---|---|---|---|---|
| Cola | 120 | 200003010931 | — | --- |
| Love | 500 | 200003011012 | company A | --- |
| Coffee | 120 | 200003011015 | — | --- |
| ¦ | ¦ | ¦ | ¦ | ¦ |

3 to 5 Data transmitting server of intangible item supplying companies A to C
6 Banking agency
8 Public communication line
9 System control server
20 Control computer
X, Y Management company of automatic vending machine
X1, X2, Y1, Y2 Automatic vending machine X, Y Management company of automatic vending machine A, B, C Intangible item supplying company 6 Banking agency 9 System control server X1, X2, Y1, Y2 Automatic vending machine ① Data transmitting request ② Music soft ③ Sales data ④ Sales amount ⑤ Result for adjustment ⑥ Control change information

MANAGEMENT METHOD OF AUTOMATIC VENDING MACHINE AND AUTOMATIC VENDING MACHINE

FIELD OF THE INVENTION

The present invention relates to a management method of automatic vending machine and an automatic vending machine capable of selling items or goods supplied by plural vendors, for example, tangible items such as drinks supplied by one vendor and intangible items such as music soft supplied by different vendor.

BACKGROUND OF THE INVENTION

An automatic vending machine for selling canned drinks has been markedly expanded and many automatic vending machines are installed everywhere in towns and streets. Further, an automatic vending machine for selling intangible items such as information (e.g. music data) recorded in a recording medium (e.g. Mini Disk) has been developed as disclosed in Japanese Patent Publication (Unexamined or Kokai) 31217/1999 (IPC: G06F 17/30).

In such automatic vending machine, the vending machine and a music delivery server are connected through a communication line, a music data is transmitted in response to a request from the automatic vending machine, and the music data is sold which is transmitted to the automatic vending machine and is recorded in a recoding medium such as MD existed in the automatic vending machine. According to the automatic vending machine, it is possible for customers to easily obtain wide variety of music data from the latest music to the least marketed music at cheap cost.

However, in case that the automatic vending machine for selling intangible items is installed, it is necessary to look for and secure installation places or sites where many customers are available, and it is another problem to spend much cost in order to construct communication lines between the vending machine and the data delivery servers.

SUMMARY OF THE INVENTION

Therefore, it is an object of the invention to resolve such problem and to easily expand automatic sales of items supplied by different vendors without securing an installation place and a communication line and without much cost.

The above object of the invention can be achieved by a management method of automatic vending machine and an automatic vending machine, as one aspect of the invention, which comprises managing an automatic vending machine selling items supplied by different vendors, automatically calculating a sales amount of each vendor based on sales data of each vendor prepared in the automatic vending machine by computer, and adjusting sales amount of each vendor based on the calculating result, whereby automatic sales of items supplied by different vendors can be spread without securing new installation place of the automatic vending machine.

According to second aspect of the invention, the management method comprises connecting the automatic vending machine and a control computer for controlling the automatic vending machine through a communication means, and calculating the sales amount of each vendor by the control computer, whereby the sales amount can be automatically calculated.

According to fourth aspect of the invention, the management method comprises connecting vendors to the automatic vending machine through a communication means, and transmitting data of intangible items from the vendors to the automatic vending machine through the communication means, whereby vendor controls data of the intangible items at one place and sells them by a lot of the automatic vending machines which are installed at remote places.

According to fifth aspect of the invention, the management method comprises transmitting a sales data from the automatic vending machine to the vendors, whereby each of the vendor can confirm its sales amount in respect place.

According to fifth aspect of the invention, the management method comprises transmitting a sales data from the automatic vending machine to the venders, whereby each of the vender can confirm its sales amount in respect place.

According to sixth aspect of the invention, the management method comprises connecting the control computer to a banking agency through the communication line and adjusting sales amount in the banking agency, whereby management company of the automatic vending machine does not need to adjust the sales amount.

According to seventh aspect of the invention, the management method comprises connecting the banking agency to the vendors through the communication line and transmitting the calculation result from the banking agency to the vendors, whereby the vendors can confirm adjustment of sales amount.

According to eighth aspect of the invention, the management method comprises selling data written in a recording medium as intangible items, whereby the intangible items such as music data can be sold by writing it in the recording medium.

According to ninth aspect of the invention, the management method comprises accumulating data of the intangible items in the automatic vending machine in advance, whereby burden of the communication is reduced.

According to tenth aspect of the invention, the management method comprises providing a system control server for relaying the communication, and implementing the communication between the automatic vending machine and the control computer for controlling the automatic vending machine through the system control server, whereby the communication control can be simplified because the automatic vending machine and the control computer are directly communicated only to the system control server.

According to eleventh aspect of the invention, the management method comprises connecting the system control server to the vendor through the communication means, and implementing the communication between the automatic vending machine and the vendor through the system control server, whereby the communication control can be simplified because the automatic vending machine and the vendor are directly communicated only to the system control server.

According to twelfth aspect of the invention, the management method comprises connecting the system control server to the banking agency through the communication means, calculating the sales amount of each vendor using the sales data of each vendor in the automatic vending machine by the system control server, transmitting the calculated result to the banking agency, and adjusting the sales amount in the banking agency, whereby the calculated result can be directly transmitted from the system control server to the banking agency.

According to thirteenth aspect of the invention, the management method comprises accumulating the data of the intangible agency in the system control server, and transmitting it from the system control server to the automatic vending machine, whereby burden of the communication can be reduced.

According to fourteenth aspect of the invention, an automatic vending machine is capable of selling items supplied by plural vendors, is connected to a control computer for controlling the automatic vending machine through a communication means, transmits sales data of each vendor through the communication means to the control computer, and makes the control computer to automatically calculate sales amount of each vendor, whereby automatic sales of items supplied by different vendors can be spread without securing new installation place of the automatic vending machine, and the sales amount of each vendor can be automatically calculated.

According to fifteenth aspect of the invention, the automatic vending machine can sell tangible items and intangible items, in combination, whereby the automatic sales of intangible items can be easily spread without securing an installation place and a communication line and without much cost.

According to sixteenth aspect of the invention, the automatic vending machine is connected to the vendors through the communication means, and receives data of intangible ins from the vendors through the communication means to sell the items, whereby the vendor can control the data of the intangible items at one place and can sell them by a lot of the automatic vending machines which are installed at remote places.

According to seventeenth aspect of the invention, the automatic vending machine transmits a sales data to the vendors, whereby each of the vendors can confirm its sales amount in respective place.

According to eighteenth aspect of the invention, the automatic vending machine can write data as items in a recording medium and sell the recording medium as intangible items, whereby the intangible items such as music data can be sold by writing it in the recording medium.

According to nineteenth aspect of the invention, the automatic vending machine can accumulate the data of the intangible items therein in advance, whereby burden of the communication is reduced.

According to twentieth aspect of the invention, the automatic vending machine is connected to a system control server for relaying the communication with the control computer, and communicates with the control computer through the system control server, whereby the communication control can be simplified because the automatic vending machine and the control computer are directly communicated only to the system control server.

According to twenty-first aspect of the invention, the automatic vending machine can communicate with the vendors through the system control server, whereby the communication control can be simplified because the automatic vending machine and the vendors are directly communicated only to the system control server.

According to twenty-second aspect of the invention, the automatic vending machine can transmit the sales amount of each vendor to the system control server, and can make the system control server to calculate the sales amount of each vendor, whereby the calculated result can be directly transmitted from the system control server to the banking agency.

According to twenty-third aspect of the invention, the system control server receives the data of the intangible items accumulated in the system control server, and sells it, whereby burden of the communication can be reduced.

According to twenty-fourth aspect of the invention, the automatic vending machine can sell music data as intangible items, whereby the automatic sales of music data can be easily spread at low cost and without securing new installation places or sites of the automatic vending machine and a communication line.

According to twenty-fifth aspect of the invention, the automatic vending machine can sell fortune-telling data as intangible items, whereby the automatic sales of fortune-telling data can be easily spread at low cost and without securing new installation places or sites of the automatic vending machine and a communication line.

BRIEF DESCRIPTION OF THE DRAWINGS

FIG. 1 is a drawing showing a first embodiment of the invention.

FIG. 5 is a drawing showing a record of sales information in the control computer of the automatic vending machine.

DETAILED DESCRIPTION OF THE INVENTION

Figure 2:
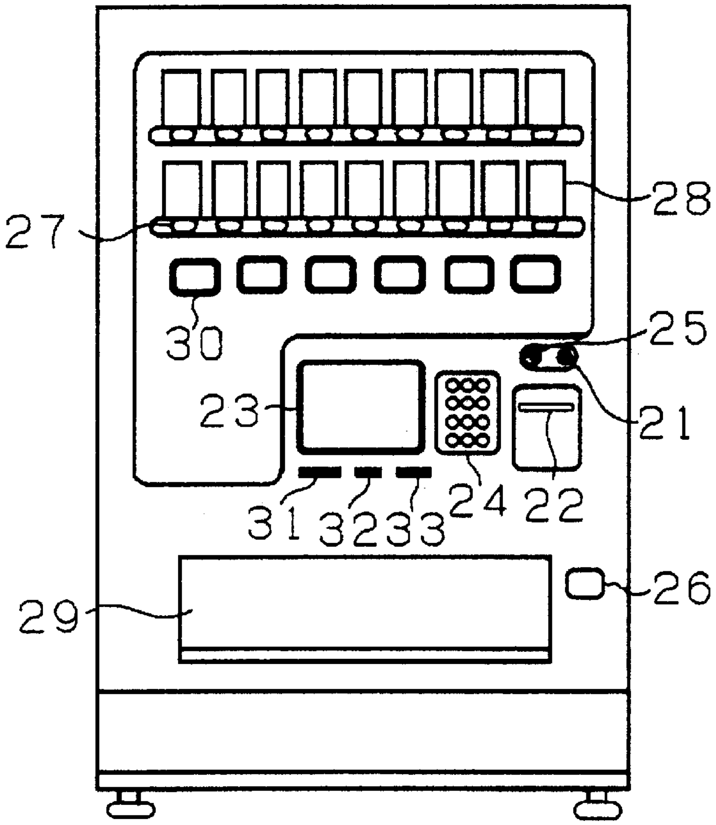
FIG. 2 is a perspective view of the automatic vending machine in the management system of the invention.

The invention will be explained in accordance with embodiments in detail.

In FIG. 1, an automatic vending machine 1 of the invention can sell tangible items such as drinks or cigarette, and intangible items such as music data, fortune-telling data, image soft, game soft, personal computer (PC) soft, map information, stock information, recruitment information or cooking recipe.

In case that the tangible items are sold, coin or bill (hereinafter, called as coin collectively) is put in a coin slot existed in an accounting unit 12 and a selection button of the tangible items, which is a tangible-item selection means, and exists in a customer operation unit 11, is pressed to dispense the item selected from a vending unit 14 of the tangible items, which is a tangible-item vending means. Coins put in the accounting unit 11 are stored in a safe (money box) and then are collected by a worker of management company 2 of the automatic vending machine. In case that the remaining items in the vending unit 14 of the tangible items become less, the same items are replenished by the worker.

The automatic vending machine 1 has a communication unit 15 as a communication means with outside thereof and can implement a data exchange communication with a control computer 20 of the management company 2 or data transmitting servers 3, 4, 5 of intangible item-supplying companies A, B, C, which are vendors of intangible items, through a public communication line 8. In case that the intangible items are sold, a selection button of intangible items existed in a customer operation unit 11 is pressed to select a necessary item, and then it is requested to transmit data of the selected item to the data transmitting servers 3 to 5 of the intangible item-supplying companies A to C. As a result, the automatic vending machine receives the data from the data transmitting servers 3 to 5 and then vending units 16, 17, 18 in the companies A, B, C write the data in a recording medium such as MD, memory card or memory stick, respectively and then sell the recording medium.

In FIG. 2, numeral 21 is a coin slot, numeral 22 is a bill slot, numeral 23 is a display, numeral 24 is a keyboard, numeral 25 is a refund lever, numeral 26 is a (refund or change) coin return opening, numeral 27 is a selection button of tangible items, numeral 28 is an item sample, numeral 29 is an item dispense opening, numeral 30 is a selection button of intangible items, and numerals 31 to 33 are insertion openings of recording media.

In case that drinks are purchased by a customer, similar to conventional automatic vending machines for drinks, coins or bills are put in the coin slot 21 or bill slot 22 and the selection button 27 of tangible items are pressed to dispense a desired item in the item dispense opening 29.

In case that intangible items are purchased, the selection button 30 of intangible items are pressed, which is separated into a kind of items such as music, fortune-telling, image or game soft, to show guidance on the display 23. The desired item is selected by operation of the keyboard. Then, after necessary amount of coins or bills is put in the slot 21 or 22, the recording medium is put in the insertion opening 31, 32 or 33 and an action button in the keyboard is pressed.

Figure 3:
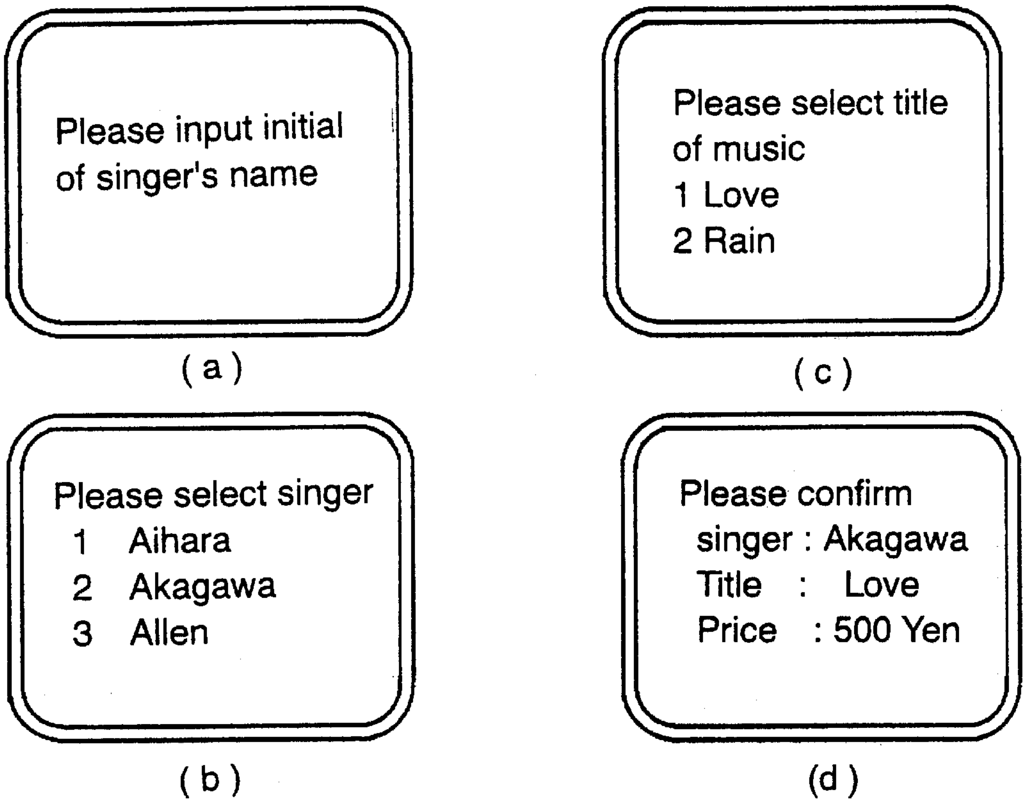
FIG. 3 is a drawing showing a display in case of selling the music soft.

An example for vending music data will be shown on the display 23. In FIG. 3, when a music button in the selection button 30 of intangible items is pressed, an input guidance of "Please input an initial of singer's name" is displayed as shown in FIG. 3(*a*) . When a key of "p", for example, on the keyboard 24 is touched, a list of singers as singer-selecting information is displayed on the screen as shown in FIG. 3(*b*) . After the name of desired singer (e.g. "2. Akagawa") is selected, a key of "2", for example, is touched to display titles of music sung by the singer as shown in FIG. 3(*c*). The desired title (e.g. "1. Love") is selected by touching a key of "1" to display the confirmation "Do you agree that singer is Akagawa, music title is Love and cost is 500 yen ?" as shown in FIG. 3(*d*). Then, it is indicated on the display to put coins or bills in the slot and to put a recording medium in the insertion opening. When the customer puts the indication into practice, the music data is written in the recording medium.

Figure 4:
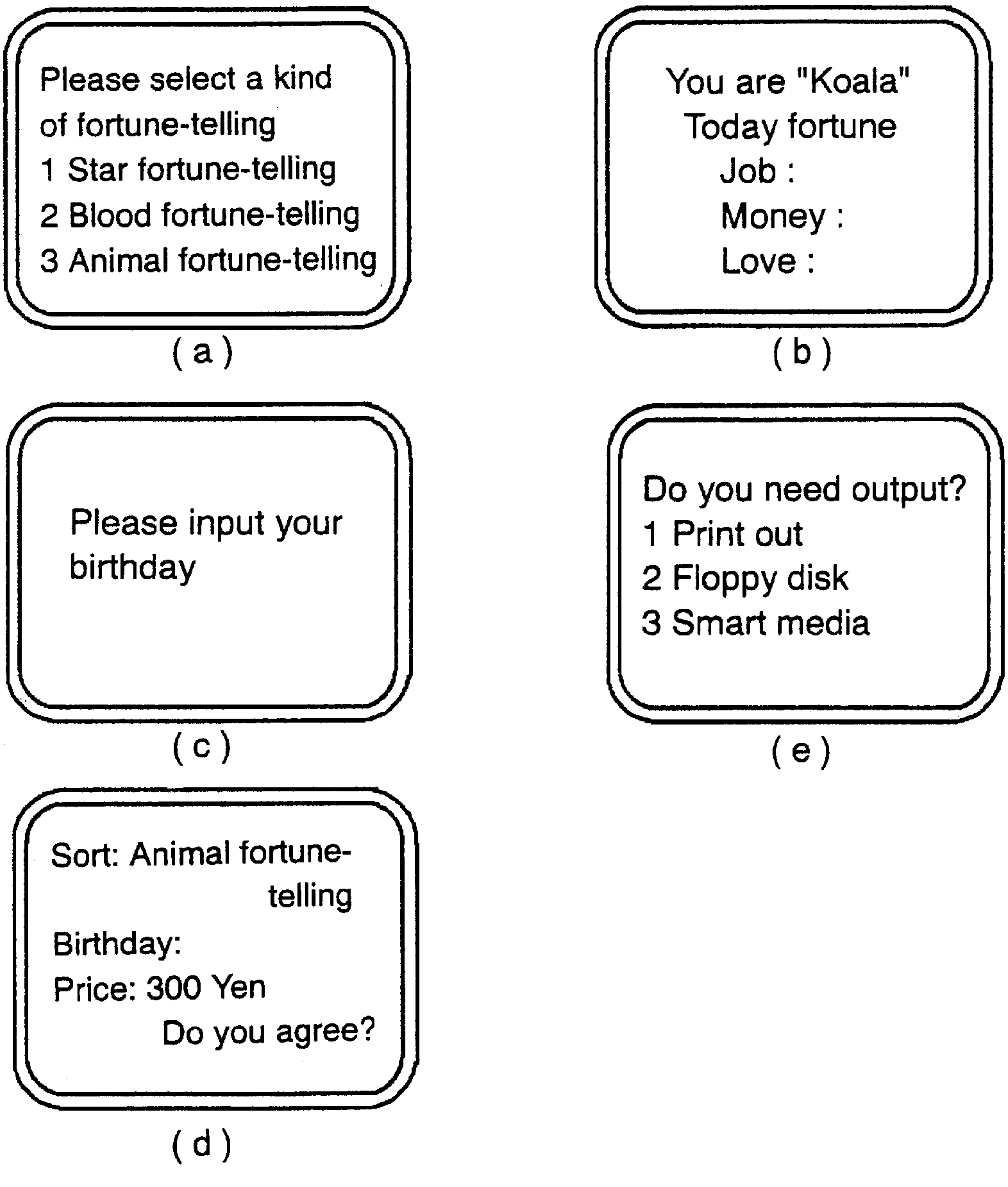
FIG. 4 is a drawing showing a display in case of selling the fortune-telling soft.

An example for vending fortune-telling data will be shown on the display 23. In FIG. 4, when a fortune-telling button in the selection button 30 of intangible items is pressed, an input guidance of "Please input a kind of fortune-telling" is displayed as shown in FIG. 4(*a*). When a key of "3", for example, on the keyboard 24 is touched, an indication to input the birth day is displayed on the screen as shown in FIG. 4(*b*). After the birthday is input, the confirmation "Do you agree that a kind of fortune-telling is an animal, your birthday is - - - and cost is 300 yen?" is displayed as shown in FIG. 4(*c*). After that, when coins or bills put in the slot and a confirmation button is pressed, the customer's fortune is displayed as shown in FIG. 4(*d*). When how to output the result is displayed as shown in FIG. 4(*e*) and then, a key of "1: Print-out", for example, is touched, the fortune-telling result is printed out from a printer (not shown).

In case that a new type of fortune-telling method such as an animal fortune-telling method, it is transmitted from a vendor to the automatic vending machine for renewal of the intangible items therein.

After the sales of intangible items as above, sales data including name of the sold items, sales date and time and the sales price are transmitted to the control computer 20 of the management company 2 of the automatic vending machine and to the data transmitting servers 3 to 5 of intangible item supplying companies A to C. In case that any trouble causes in the automatic vending machine 1, the trouble data is transmitted from the automatic vending machine 1 to the control computer 20. The sales data and the trouble data are stored in the control computer 20, in which the sales data including that of intangible data is stored in the form as shown in FIG. 5.

The management company 2 patrols the automatic vending machines to keep it, to replenish tangible items and to collect the proceeds. The collected proceeds including sales amount of tangible items and sales amount of intangible items are collectively and tentatively deposited to the predetermined account of the banking agency 6.

The sales data recorded in the control computer 20 is summed up every predetermined period (e.g. every month) and the sales amount of each vendor which supplies intangible items are calculated. The amount which is the difference of the sales amount and certain commission is communicated to the banking agency 6 and is paid to a bank account of the vendor.

The trouble data received from the automatic vending machines is transmitted from the control computer 20 through a public communication line 8 to a repair service company 7 which repairs the troubled automatic vending machine. When the service company 7 receives the trouble data, it dispatches a service person to the place where the trouble automatic vending machine is installed.

According to the system as above, it is not necessary that the companies A to C supplying intangible items look for new place where the automatic vending machine is installed because they can use the automatic vending machines installed in the sites where more customers are available for the places. Further, conventional automatic vending machines are designed so that they can be connected to communication lines in order to communicate sales data and trouble data and therefore, it is not necessary that the communication lines are secured. Accordingly, the automatic sales of intangible items can be easily spread at low cost. The management company 2 can obtain new income in the form of sales commission in addition to the present sales of tangible items.

Figure 6:
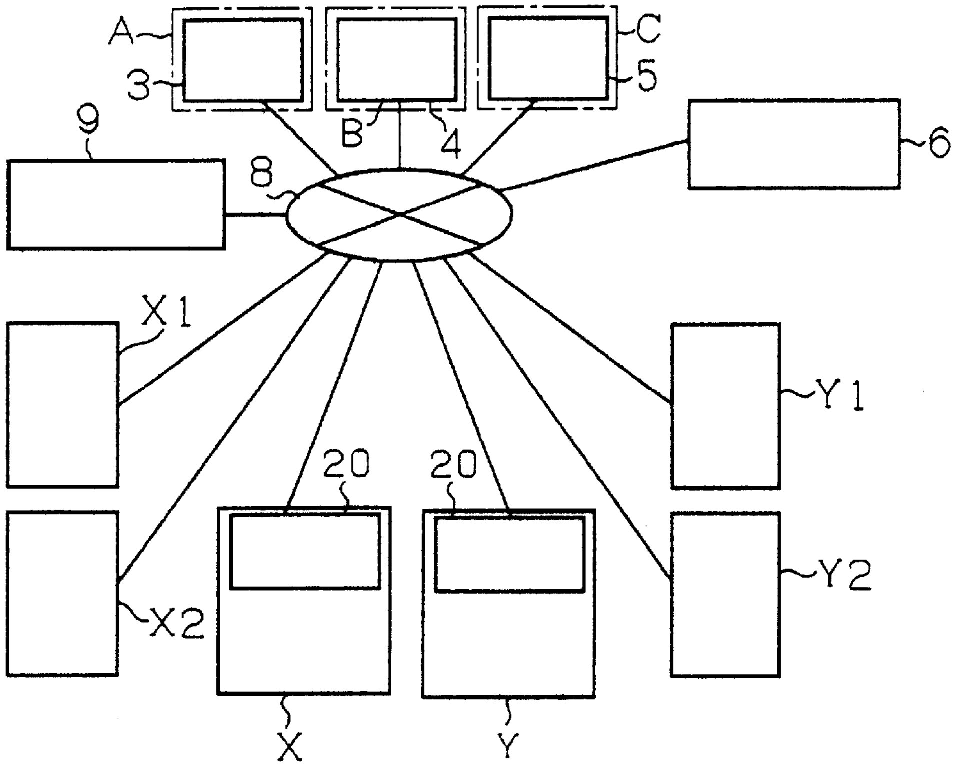
FIG. 6 is a drawing showing a second embodiment of the invention.
Figure 7:
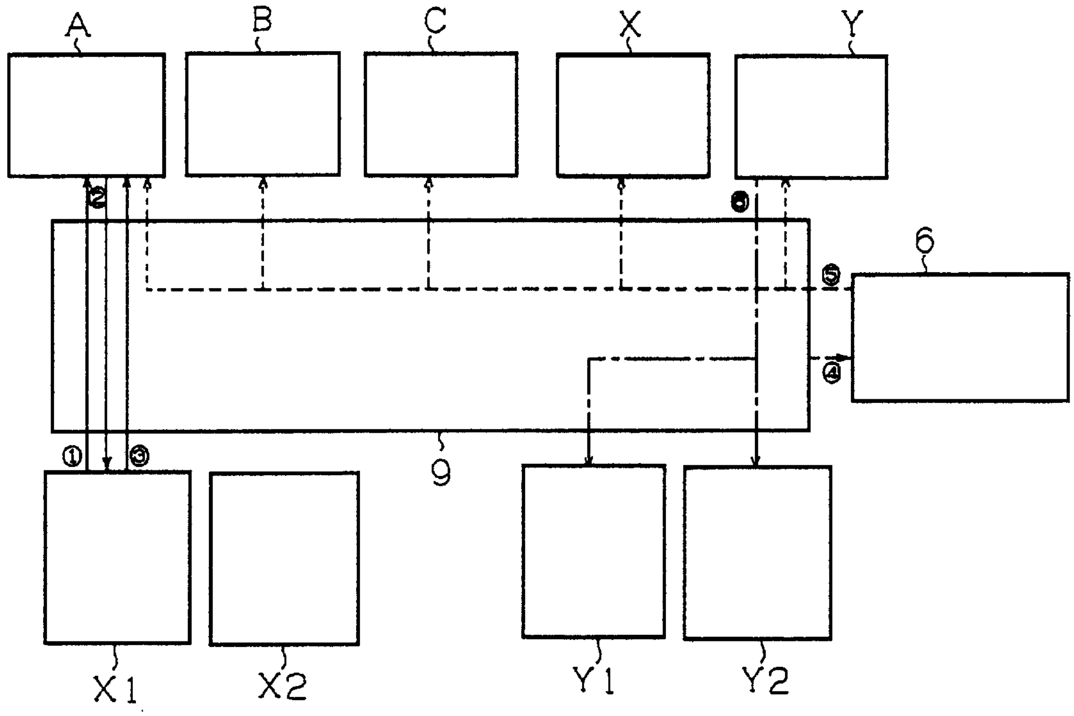
FIG. 7 is a drawing for explanation of the communication in the second embodiment of the invention.

In FIGS. 6 and 7, communication between the automatic vending machines and the control computers of plural management companies thereof or between the automatic vending machines and the data transmitting servers of intangible items supplying companies is carried out through the system control server 9. The automatic vending machines X1, X2, Y1, Y2 have same functions as those of the automatic vending machine 1 as shown in FIG. 2. The sales data of all automatic vending machines to be controlled is stored in the system control server 9 and is calculated every predetermined period.

In case that a customer purchases a music soft supplied or vended by the intangible item supplying company A in the automatic vending machine X1, the customer selects the item by the item-selecting button and keyboard in the automatic vending machine X1, whereby a data transmitting request ① is transmitted from the automatic vending machine X1 through the system control server 9 to the intangible item supplying company A. When the data transmitting server 3 of the intangible item supplying company A receives the data transmitting request ①, the requested music soft ② is transmitted from the data transmitting server 3 through the system control server 9 to the automatic vending machine X1. The music soft is written in a recording medium which is owned by the customer or offered by the automatic vending machine X1, and then is sold. After the sales of music soft ②, the sales data ③ is transmitted through the system control server 9 to the intangible item supplying company A and the control computer of the management company X of the automatic vending machine X1. The same procedure is applied to the other automatic vending machines X2, Y1 and Y2.

As mentioned above, sales data in all of the controlled automatic vending machines are stored in the system control server 9, and is calculated every predetermined period (e.g. every one month) to sum up the sale amount of each tangible item supplying company (vendor) in each management company of the automatic vending machine. And, the summed-up sales amounts or proceeds ④ are transmitted to the banking agency 6 and are adjusted by sending the amount from the account of the management company of the automatic vending machine to the account of the tangible item supplying company. The adjustment result ⑤ is transmitted from the banking agency 6 through the system control server 9 to the control computer of the management companies X and Y of the automatic vending machines, and to the data transmitting servers 3 to 5 of intangible supplying companies A to C.

In case that control of automatic vending machines which are managed by the control computers of the management companies X and Y has to be changed, the control changing information ⑥ is transmitted from the control computers through the system control server 9 to the automatic vending machines.

It is explained in the first and second embodiments of the invention shown in FIGS. 1 and 6 that the transmission is carried out using a public phone line 8, but an internet, private line, cellular phone line, PHS line and private wireless can be used instead of the public phone line. Further, it is explained that MD, memory card and memory stick are used as the recording medium, but it is not limited to them. For example, it is possible to sell the intangible items such as map information which are printed on paper.

In the first embodiment of the invention as above, the intangible items are transmitted from the outside data transmitting server in every sales and are recorded in the recording medium, but they are introduced into a memory device of the automatic vending machine in advance and are soled by reading out of the memory device. At the time, if some of intangible items do not exist in the automatic vending machine, then it may be transmitted from the outside data transmitting server. And, it may be carried out in the second embodiment of the invention as above that the data of intangible items is accumulated in a memory device of the system control server 9 are soled by reading out of the memory device. At that time, if some of intangible items do not exist in the memory device, then it may be received from the outside data transmitting server. According to these ways, the burden of communication is reduced.

The management method and the automatic vending machine of the invention provide the following advantages because they are constructed as explained above.

In the management method of automatic vending machine as one aspect of the invention, a sales amount of each vendor is automatically calculated based on sales data of each vendor prepared in the automatic vending machine by computer, and sales amount of each vendor is adjusted based on the calculating result. As a result, automatic sales of items supplied by different vendors can be spread without securing new installation place of the automatic vending machine.

In the management method as second aspect of the invention, the automatic vending machine is connected to a control computer for controlling the automatic vending machine through a communication means, and the sales amount of each vendor is calculated by the control computer and therefore, the sales amount can be automatically summed up.

In the management method as third aspect of the invention, the tangible items and intangible items are sold, in combination, in the automatic vending machine, and therefore, the automatic sales of intangible items can be easily spread without securing an installation place and a communication line and without much cost.

In the management method as fourth aspect of the invention, the automatic vending machine is connected to the vendors through a communication means and the data of intangible items is transmitted from the vendors to the automatic vending machine through the communication means, and therefore, the vendor controls data of the intangible items at one place and sells them by a lot of the automatic vending machines which are installed at remote places.

In the management method as fifth aspect of the invention, the sales data is transmitted from the automatic vending machine to the vendors, and therefore, each of the vendor can confirm its sales amount in respect place.

In the management method as sixth aspect of the invention, the control computer is connected to a banking agency through the communication line and the sales amount is adjusted in the banking agency, and therefore, the management company of the automatic vending machine does not need to adjust the sales amount.

In the management method as seventh aspect of the invention, the banking agency is connected to the vendors through the communication line and the calculation result is transmitted from the banking agency to the vendors, and therefore, the vendors can confirm adjustment of sales amount.

In the management method as eighth aspect of the invention, the data written in a recording medium as intangible items is sold, and therefore, the sales of the intangible items such as music data is possible by writing it in the recording medium.

In the management as ninth aspect of the invention, the data of the intangible items is accumulated in the automatic vending machine in advance, and therefore, the burden of the communication is reduced.

In the management method as tenth aspect of the invention, the system control server for relaying the communication is provided, and the communication between the automatic vending machine and the control computer for controlling the automatic vending machine is implemented through the system control server, and therefore, the communication control can be simplified because the automatic vending machine and the control computer are directly communicated only to the system control server.

In the management method as eleventh aspect of the invention, the system control server is connected to the vendor through the communication means, and the communication between the automatic vending machine and the vendor is implemented through the system control server, and therefore, the communication control can be simplified because the automatic vending machine and the vendor are directly communicated only to the system control server.

In the management method as twelfth aspect of the invention, the system control server is connected to the banking agency through the communication means, the sales amount of each vendor is calculated using the sales data of each vendor in the automatic vending machine by the system control server, the calculated result is transmitted to the banking agency, and the sales amount is adjusted in the banking agency, and therefore, the calculated result can be directly transmitted from the system control server to the banking agency.

In the management method as thirteenth aspect of the invention, the data of the intangible agency is accumulated in the system control server, and it is transmitted from the system control server to the automatic vending machine, and therefore, the burden of the communication can be reduced.

In the automatic vending machine as fourteenth aspect of the invention, it is capable of selling items supplied by plural vendors, is connected to a control computer for controlling the automatic vending machine through a communication means, transmits sales data of each vendor through the communication means to the control computer, and makes the control computer to automatically calculate sales amount of each vendor. Accordingly, the automatic sales of items supplied by different vendors can be spread without securing new installation place of the automatic vending machine, and the sales amount of each vendor can be automatically calculated.

In the automatic vending machine as fifteenth aspect of the invention, it can sell tangible items and intangible items, in combination. Accordingly, the automatic sales of intangible items can be easily spread without securing an installation place and a communication line and without much cost.

In the automatic vending machine as sixteenth aspect of the invention, it is connected to the vendors through the communication means, and receives data of intangible items from the vendors through the communication means to sell the items. Accordingly, the vendor can control the data of the intangible items at one place and can sell them by a lot of the automatic vending machines which are installed at remote places.

In the automatic vending machine as seventeenth aspect of the invention, the sales data is transmitted to the vendors. Accordingly, each of the vendors can confirm its sales amount in respective place.

In the automatic vending machine as eighteenth aspect of the invention, it can write data as items in the recording medium and sell the recording medium as intangible items. Accordingly, the intangible items such as music data can be sold by writing it in the recording medium.

In the automatic vending machine as nineteenth aspect of the invention, it can accumulate the data of the intangible items therein in advance. Accordingly, the burden of the communication is reduced.

In the automatic vending machine as twentieth aspect of the invention, it is connected to the system control server for relaying the communication together with the control computer, and is communicated with the control computer through the system control server. Accordingly, the communication control can be simplified because the automatic vending machine and the control computer are directly communicated only to the system control server.

In the automatic vending machine as twenty-first aspect of the invention, it can communicate with the vendors through the system control server. Accordingly, whereby the communication control can be simplified because the automatic vending machine and the vendors are directly communicated only to the system control server.

In the automatic vending machine as twenty-second aspect of the invention, it can transmit the sales amount of each vendor to the system control server, and can make the system control server to calculate the sales amount of each vendor. Accordingly, the calculated result can be directly transmitted from the system control server to the banking agency.

In the automatic vending machine as twenty-third aspect of the invention, the system control server receives the data of the intangible items accumulated in the system control server and sells it. Accordingly, the burden of the communication can be reduced.

In the automatic vending machine as twenty-fourth aspect of the invention, it can sell music data as intangible items. Accordingly, the automatic sales of music data can be easily spread at low cost and without securing new installation places or sites of the automatic vending machine and the communication line.

In the automatic vending machine as twenty-fifth aspect of the invention, it can sell fortune-telling data as intangible items. Accordingly, the automatic sales of fortune-telling data can be easily spread at low cost and without securing new installation places or sites of the automatic vending machine and the communication line.

What is claimed is:

1. A management method of automatic vending machine, which comprises selling items supplied by different vendors, automatically calculating a sale amount of each vendor based on sales data of each vendor prepared in the automatic vending machine by computer, and adjusting a sales amount in a banking agency of each vendor based on the calculating result, wherein the automatic vending machine and a control computer for controlling the automatic vending machine are connected through a communication means, and the sales amount of each vendor is calculated by the control computer, tangible items and intangible items are sold, in combination, by the automatic vending machine, and vendors and the automatic vending machine are connected through a communication means, and data as intangible items are transmitted from the vendors to the automatic vending machine through the communication means.

2. The management method according to claim 1, wherein the data as intangible items is sold by being written into a recording medium.

3. The management method according to claim 1, wherein the data as intangible items are accumulated in the automatic vending machine, in advance.

4. The automatic vending machine according to claim 1, wherein the sales amount of each vendor is transmitted to a system control server, and the sales amount of each vendor is calculated by the system control server.

5. The management method according to claim 1, wherein a system control server for relaying communication is installed, and the communication between the automatic vending machine and the control computer for controlling the automatic vending machine is implemented through the system control server.

6. The management method according to claim 5, wherein the system control server is connected to the vendor through a communication means, and a communication between the automatic vending machine and the vendor is implemented through the system control server.

7. The management method according to claim 5, wherein the data as intangible items are accumulated in the system control server, and are transmitted from the system control server to the automatic vending machine.

8. The management method of automatic vending machine, which comprises selling items supplied by different vendors, automatically calculating a sale amount of each vendor based on sales data of each vendor prepared in the automatic vending machine by computer, and adjusting a sales amount in a banking agency of each vendor based on the calculating result, wherein the automatic vending machine and a control computer for controlling the automatic vending machine are connected through a communication means, and the sales amount of each vendor is calculated by the control computer, wherein tangible items and intangible items are sold, in combination, by the automatic vending machine, wherein vendors and the automatic vending machine are connected through a communication means, and data of intangible items are transmitted from the vendors to the automatic vending machine through the communication means, wherein the sales data is transmitted from the automatic vending machine to the vendors through the communication means.

9. The management method of automatic vending machine, which comprises selling items supplied by different vendors, automatically calculating a sale amount of each vendor based on sales data of each vendor prepared in the automatic vending machine by computer, and adjusting a sales amount in a banking agency of each vendor based on the calculating result, wherein the automatic vending machine and a control computer for controlling the automatic vending machine are connected through a communication means, and the sales amount of each vendor is calculated by the control computer, and the control computer is connected to a banking agency through a communication means and adjustment of the sales amount is carried out in the banking agency.

10. The management method of automatic vending machine, which comprises selling items supplied by different vendors, automatically calculating a sale amount of each vendor based on sales data of each vendor prepared in the automatic vending machine by computer, and adjusting a sales amount in a banking agency of each vendor based on the calculating result, wherein the automatic vending machine and a control computer for controlling the automatic vending machine are connected through a communication means, and the sales amount of each vendor is calculated by the control computer, wherein the control computer is connected to a banking agency through the communication line and adjustment of the sales amount is carried out in the banking agency, wherein the banking agency is connected to the vendors through a communication means and a result of the adjustment is transmitted from the banking agency to the vendors through the communication means.

11. The management method of automatic vending machine, which comprises selling items supplied by different vendors, automatically calculating a sales amount of each vendor based on sales data of each vendor prepared in the automatic vending machine by computer, and adjusting sales amount of each vendor based on the calculating result, wherein the automatic vending machine and a control computer for controlling the automatic vending machine are connected through a communication means, and the sales amount of each vendor is calculated by the control computer, wherein tangible items and intangible items are sold, in combination, by the automatic vending machine, wherein a system control server for relaying the communication is installed, and the communication between the automatic bending machine and the control computer for controlling the automatic vending machine is implemented through the system control server, wherein the system control server is connected to the vendor through the communication means, and the communication between the automatic vending machine and the vendor is implemented through the system control server, wherein the system control server is connected to the banking agency through a communication means, the sales amount of each vendor is calculated using the sales data of each vendor in the automatic vending machine by the system control server, a calculated result is transmitted to the banking agency, and the sales amount is adjusted in the banking agency.

12. The automatic vending machine which is capable of selling items supplied by plural vendors, is connected to a control computer for controlling the automatic vending machine through a communication means, transmits sales data of each vendor through the communication means to the control computer, and makes the control computer to automatically calculate sales amount of each vendor, wherein tangible items and intangible items are sold, in combination, wherein said vending machine is connected to the vendors through the communication means, and receives data as intangible items from the vendors through the communication means to sell the items.

13. The automatic vending machine which is capable of selling items supplied by plural vendors, is connected to a control computer for controlling the automatic vending machine through a communication means, transmits sales data of each vendor through the communication means to the control computer, and makes the control computer to automatically calculate sales amount of each vendor, wherein tangible items and intangible items are sold, in combination, wherein said vending machine is connected to the vendors through the communication means, and receives data of intangible items from the vendors through the communication means to sell the items, wherein said vending machine transmits the sales data to the vendors.

14. The automatic vending machine according to claims 12 or 13, wherein the data as intangible items is sold by being written into a recording medium.

15. The automatic vending machine according to claims 12 or 13, wherein the data as intangible items is accumulated therein, in advance.

16. The automatic vending machine according to claims 12 or 13 wherein music data is sold as intangible items.

17. The automatic vending machine according to claims 12 or 13, wherein fortune-telling data is sold as intangible items.

18. The automatic vending machine according to claims 12 or 13, wherein said vending machine is connected to a system control server for relaying communication with the control computer and is communicated with the control computer through the system control server.

19. The automatic vending machine according to claim 18, wherein said vending machine is communicated with the vendors through the system control server.

20. The automatic vending machine according to claim 18, wherein the data as intangible items accumulated in and received from the system control server is sold.

* * * * *